United States Patent
Sorensson et al.

(10) Patent No.: US 8,046,023 B2
(45) Date of Patent: Oct. 25, 2011

(54) MOBILE COMMUNICATION DEVICE WITH DIRECTION INDICATOR

(75) Inventors: Stefan Sorensson, Sodra Sandby (SE); Martin Wezowski, Malmo (SE)

(73) Assignee: Sony Ericsson Mobile Communications AB, Lund (SE)

( * ) Notice: Subject to any disclaimer, the term of this patent is extended or adjusted under 35 U.S.C. 154(b) by 758 days.

(21) Appl. No.: 12/044,541

(22) Filed: Mar. 7, 2008

(65) Prior Publication Data

US 2009/0227268 A1 Sep. 10, 2009

(51) Int. Cl.
*H04M 1/00* (2006.01)
*H04W 24/00* (2009.01)

(52) U.S. Cl. .................. 455/550.1; 455/456.1

(58) Field of Classification Search ............ 455/575.1, 455/456.1, 456.2, 566, 446, 556, 434, 574, 455/440, 575.2, 575.3; 370/395.52
See application file for complete search history.

(56) References Cited

U.S. PATENT DOCUMENTS

| 2003/0195695 A1* | 10/2003 | Maruyama et al. .......... 701/200 |
| 2004/0203391 A1* | 10/2004 | Hoshina ....................... 455/41.2 |
| 2007/0211328 A1* | 9/2007 | Lerenius et al. ............. 359/265 |

FOREIGN PATENT DOCUMENTS

JP 2007/189722 7/2007

OTHER PUBLICATIONS

Notification of Transmittal of the International Search Report and the Written Opinion of the International Searching Authority, or the Declaration for PCT/IB2008/053610, mailed Jul. 3, 2009.

\* cited by examiner

*Primary Examiner* — George Eng
*Assistant Examiner* — Michael Faragalla
(74) *Attorney, Agent, or Firm* — Snyder, Clark, Lesch & Chung, LLP (57) ABSTRACT

A mobile communication device includes a processor to identify a direction related to the geo-positioning signals; a display including a pre-defined shape to indicate the direction related to the geo-positioning signals, where the pre-defined shape is exhibited when an optical property of the pre-defined shape is altered; and a power source to supply voltage to the pre-defined shape, where the optical property of the pre-defined shape is altered by a burst of voltage.

19 Claims, 9 Drawing Sheets

MOBILE COMMUNICATION DEVICE WITH DIRECTION INDICATOR

BACKGROUND

Mobile communication devices are being developed with more features that make them an integral part of a user's everyday experience. The combination of multiple features in a single communication device may provide the user with a single tool that can eliminate the need for carrying multiple devices.

Convergence of multiple features into a single mobile communication device presents a variety of design challenges, including, notably, increased power-consumption to support the features. Thus, the addition of features in a manner that effectively performs a function with minimum power consumption of the mobile communication device is desirable.

SUMMARY

According to one aspect, a mobile communication device may include a receiver to receive geo-positioning signals; a processor to identify a direction related to the geo-positioning signals; a display including a pre-defined shape to indicate the direction related to the geo-positioning signals, where the pre-defined shape is exhibited when an optical property of the pre-defined shape is altered; and a power source to supply voltage to the pre-defined shape, where the optical property of the pre-defined shape is altered by a burst of voltage.

Additionally, the optical property of the pre-defined shape may remain substantially stable after the burst of voltage is removed.

Additionally, the display may be an electrochromic display.

Additionally, the mobile communication device may further include a cellular radio telephone and where the optical property of the pre-defined shape remains substantially stable when the cellular radio telephone is in operation.

Additionally, a plurality of pre-defined shapes may each indicate a unique direction and power may be supplied to one of the pre-defined shapes based on the direction related to the geo-positioning signal.

Additionally, the mobile communication device may further include a backside cover, where the display is formed on the backside cover.

Additionally, the backside cover may include electrochromic glass.

Additionally, the mobile communication device may further include logic to automatically switch from displaying the pre-defined shape to displaying another pre-defined shape based on a change in the orientation of the mobile communication device.

Additionally, the direction related to the geo-positioning signals may be a direction to a target requested by a user.

Additionally, the display may further include at least one identifier for the target that is configured to remain exhibited after supplied power is removed from the display.

Additionally, the display may further include at least one identifier for the target that is configured to remain exhibited after supplied power is removed from the display.

Additionally, the target may be another mobile communication device.

Additionally, the mobile communication device may further include a memory, where the target is a geographic location, and where the geographic coordinates for the target are stored in the memory.

Additionally, the geo-positioning signals may be Global Positioning System (GPS) signals.

Additionally, the optical property may be altered from a transparent state to a reflective state.

According to another aspect, a method performed by a mobile device may include receiving a request for a direction to a target; determining a geo-spatial position of the mobile device; determining a geo-spatial position of the target; and indicating on the mobile device an approximate direction from the mobile device to the target, where the indicating includes displaying a direction indicator on the mobile device that remains exhibited when no power is supplied.

Additionally, the method may include monitoring at least one of an orientation or the geo-spatial position of the mobile device; and changing the direction indicator when the orientation or the geo-spatial position of the mobile device changes to an extent that the direction indicator no longer indicates the approximate direction to the target.

Additionally, the method may include monitoring a geo-spatial position of the target; and updating the display of the direction indicator when the geo-spatial position of the target changes to an extent that the direction indicator no longer indicates the approximate direction to the target.

Additionally, the method may include indicating on the mobile device an identifier for the target, where the identifier remains exhibited when no power is supplied.

Additionally, indicating on the mobile device an approximate direction may further include supplying a voltage burst to at least a portion of an electrochromic display.

According to still another aspect, a mobile device may include means for receiving a request for direction to a target; means for determining a geo-spatial position of the mobile device; means for determining a geo-spatial position of the target; means for displaying an indicator on the mobile device, where the indicator provides an approximate direction from the mobile device to the target; and power means for providing power to alter the display of the indicator on the mobile device, where the indicator remains altered after power is no longer provided.

Additionally, the mobile device may include means for monitoring an orientation of the mobile device; and means for monitoring the geo-spatial position of the target, where the display of the indicator is altered based on a change to the orientation of the mobile device and/or a change to the geo-spatial position of the target.

In another aspect, a mobile communication device may include a housing; a power supply contained within the housing; a rear cover secured to the housing and operatively connected to the power supply, the rear cover including a display including an indicator that toggles between a substantially transparent state and a substantially reflective state, where the display consumes power only when the state of the indicator is changed.

Additionally, the mobile communication device may include a location identification device to transmit and receive geo-spatial position information; and logic to alter the state of the indicator based on the geo-spatial position information.

In a further aspect, a housing for a mobile communication device may include an indicator that changes a light transmission property in response to a first burst of applied power and substantially maintains the light transmission property until receiving a second burst of applied power.

Additionally, the housing may include multiple indicators, and the light transmission properties of each of the indicators may be selectively changed to identify a particular direction.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention.

Figure 1A:
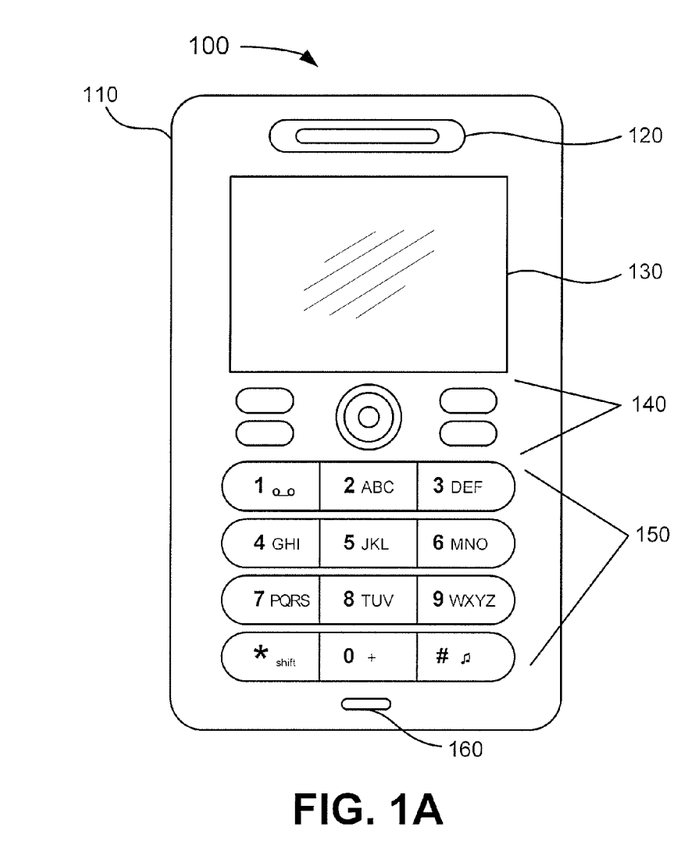
FIG. 1A is a diagram of the front surface of an exemplary mobile communication device in which methods and systems described herein may be implemented.

FIG. 1A is a diagram of the front side of an exemplary mobile communication device 100 in which methods and systems described herein may be implemented. Implementations are described herein in the context of a mobile communication device. As used herein, the term "mobile communication device" may include a cellular radiotelephone with or without a multi-line display; a Personal Communications System (PCS) terminal that may combine a cellular radiotelephone with data processing, facsimile and data communications capabilities; a personal digital assistant (PDA) that can include a radiotelephone, pager, Internet/Intranet access, Web browser, organizer, calendar and/or a global positioning system (GPS) receiver; and a laptop and/or palmtop receiver or other appliance that includes a radiotelephone transceiver. Mobile communication devices may also be referred to as "pervasive computing" devices. Mobile communication device 100 may also include media playing, recording, and storing capabilities. It should also be understood that certain systems and methods described herein may also be implemented in other devices with location identification features, with or without including various other communication functionality. For example, mobile communication device 100 may include a walkie-talkie, a PDA, a media playing device (e.g., an MPEG audio layer 3 (MP3) player, a video game playing device), portable computing device, etc. Furthermore, the mobile communication devices described herein are not limited to any particular known shape of existing mobile communication device. For example, mobile communication devices may include radiotelephones in the form of a stick/candy bar, clamshell, swivel-type, sliding-type, and/or touchscreen device.

Referring to FIG. 1A, mobile communication device 100 may include a housing 110, a speaker 120, a front display 130, control buttons 140, a keypad 150, and a microphone 160. Housing 110 may protect the components of mobile communication device 100 from outside elements. Speaker 120 may provide audible information to a user of mobile communication device 100.

Front display 130 may provide visual information to the user. For example, front display 130 may provide information regarding incoming or outgoing telephone calls and/or incoming or outgoing electronic mail (e-mail), instant messages, short message service (SMS) messages, etc. Front display 130 may further display information regarding various applications executed by mobile communication device 100, such as a phone book/contact list program, a calendar, an organizer application, navigation/mapping applications, as well as other applications. For example, front display 130 may present information and images associated with global positioning system (GPS) navigation services so that maps with selected routes are updated as a user moves from one location to another. Front display 130 may also display images associated with a camera, including pictures or videos taken by the camera and/or received by mobile communication device 100. Front display 130 may also display the current time, video games being played by a user, downloaded content (e.g., news, images, or other information), etc.

Front display 130 may include a variety of screen types, including liquid crystal display (LCD) screens and light-emitting diode (LED) screens and variants of LCD and LED screens. Certain screens may provide a high-resolution, active-matrix presentation suitable for the wide variety of applications and features associated with typical mobile communication devices. Such screens are typically back-lit and are a significant source of power consumption.

Control buttons 140 may permit the user to interact with mobile communication device 100 to cause mobile communication device 100 to perform one or more operations, such as place a telephone call, play various media, etc. For example, control buttons 140 may include a dial button, hang up button, play button, etc. In an exemplary implementation, control buttons 140 may include one or more buttons controlling a GPS-based navigation and/or mapping application. For example, one or more of control buttons 140 may be used to activate a built-in GPS receiver that determines the current position of mobile communication device 100 by receiving signals from GPS satellites. Further, one of control buttons 140 may be a menu button that permits the user to view on front display 130 various settings associated, for example, with the built-in GPS receiver.

Keypad 150 may include a standard telephone keypad. Keys on keypad 150 may perform multiple functions depending upon a particular application selected by the user. Microphone 160 may receive audible information from the user.

Figure 1B:
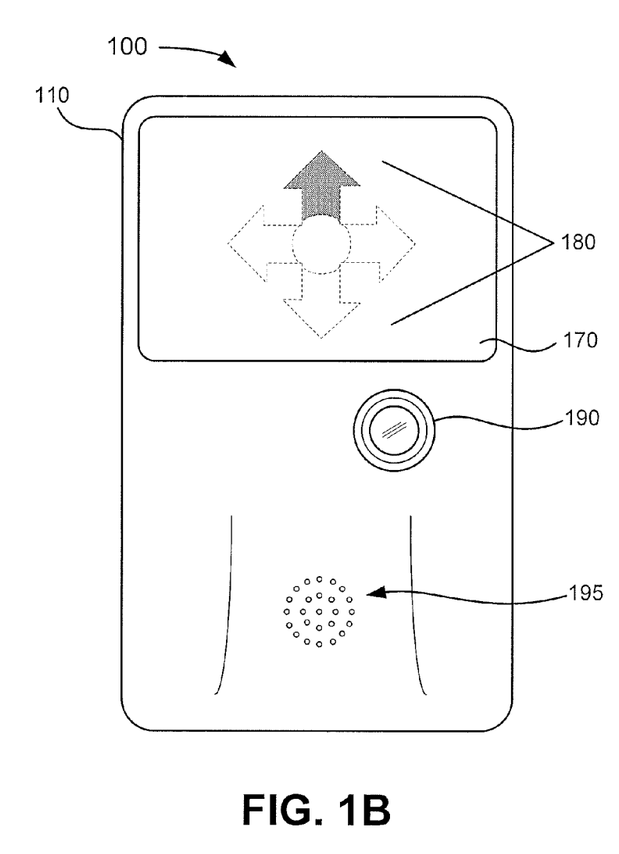
FIG. 1B is a diagram of the back surface of an exemplary mobile communication device in which methods and systems described herein may be implemented.

FIG. 1B is a diagram of the back side of the exemplary mobile communication device 100 of FIG. 1A. The back side of mobile communication device 100 may include rear display 170. Rear display 170 may include an electrochromic system that changes appearance when voltage is applied. Rear display 170 may be adjusted to selectively alter sections of rear display 170 between, for example, reflective and transparent. In one implementation the electrochromic system may include shapes for indicators 180 in rear display 170 so that an indication may be displayed when the optical properties of a shape are changed, for example, from transparent to reflective. In another implementation, rear display 170 may include a set of indicators 180 located beneath the surface of the electrochromic glass system so that an indicator may be displayed when the optical properties of a pre-defined shape are changed, for example, from reflective to transparent. Activation of rear display 170 may be accomplished, for example, using one or more of control buttons 140 and/or a menu that permits the user to view control options for rear display 170 on front display 130. As will be discussed in more detail herein, by altering the reflective/transparent properties of the electrochromic glass system in rear display 170, each of indicators 180 may be selectively displayed to continuously indicate a direction with low power consumption.

Rear display 170 may be integrated as part of housing 110 of mobile communication device 100, or may be located on a portion of housing 110, as shown in FIG. 1B. For example, in another implementation, the electrochromic glass of rear display 170 may form the entire rear panel of housing 110. In another implementation, rear display 170 may be located on another portion of housing 110, including the front or sides.

Other mobile communication device components, such as camera lens 190 or speaker 195, may be located on the rear panel of housing 110. Camera lens 190 may be a lens for a still image or video camera and may be operatively connected to camera elements that enable mobile communication device 100 to take still pictures and/or videos. Speaker 195 may provide audible information to a user of mobile communication device 100 and may be a supplement to speaker 120.

Figure 2:
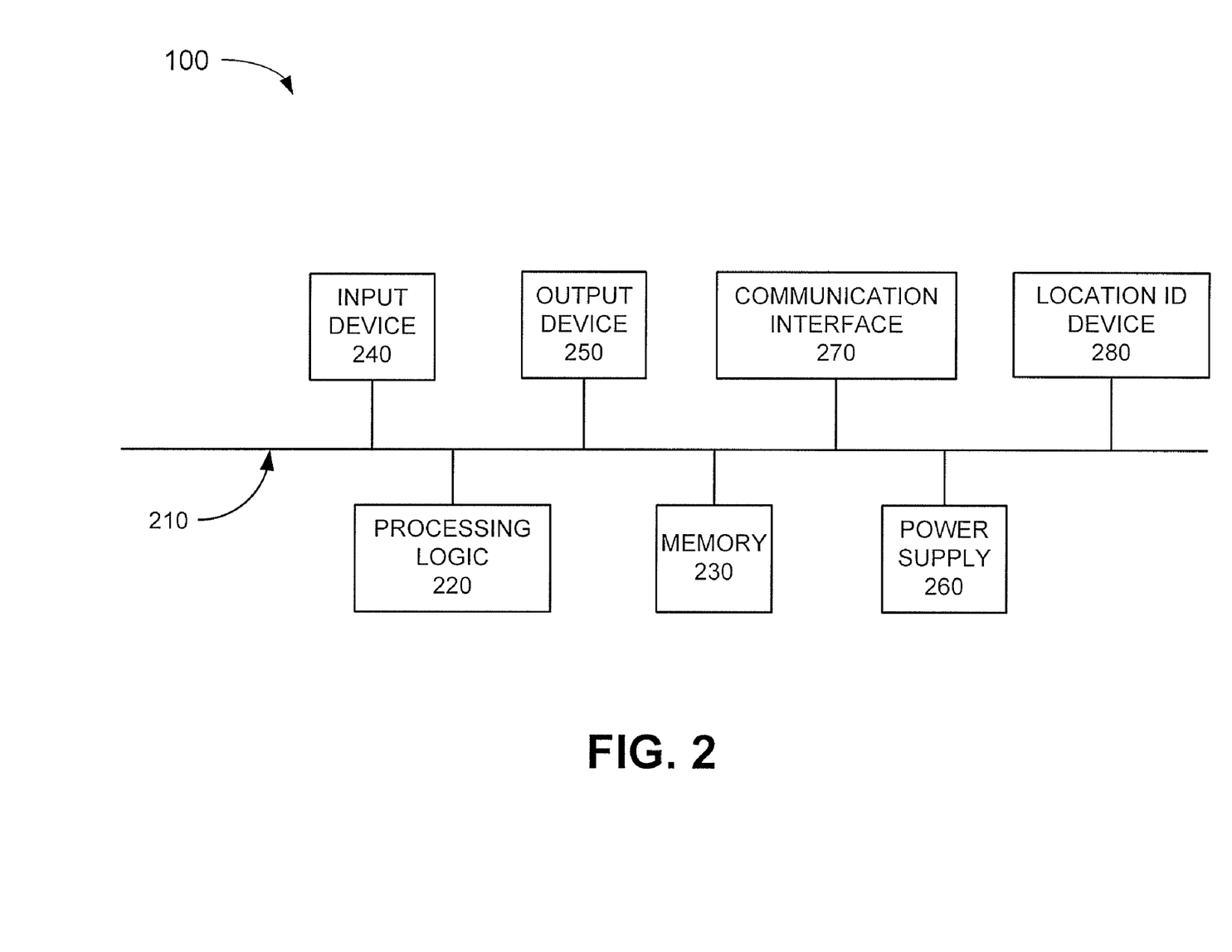
FIG. 2 is a diagram illustrating components of the mobile communication device of FIGS. 1A and 1B according to an exemplary implementation.

FIG. 2 is a diagram illustrating components of mobile communication device 100 according to an exemplary implementation. Mobile communication device 100 may include bus 210, processing logic 220, memory 230, input device 240, output device 250, power supply 260, a communication interface 270, and a location identification (ID) device 280. Mobile communication device 100 may be configured in a number of other ways and may include other or different elements. For example, mobile communication device 100 may include one or more modulators, demodulators, encoders, decoders, etc., for processing data.

Bus 210 may permit communication among the components of mobile communication device 100. Processing logic 220 may include a processor, a microprocessor, an application specific integrated circuit (ASIC), a field programmable gate array (FPGA), or the like. Processing logic 220 may execute software instructions/programs or data structures to control operation of mobile communication device 100.

Memory 230 may include a random access memory (RAM) or another type of dynamic storage device that stores information and instructions for execution by processing logic 220; a read only memory (ROM) or another type of static storage device that stores static information and instructions for use by processing logic 220; a flash memory (e.g., an electrically erasable programmable read only memory (EEPROM)) device for storing information and instructions; and/or some other type of magnetic or optical recording medium and its corresponding drive. Memory 230 may also be used to store temporary variables or other intermediate information during execution of instructions by processing logic 220. Instructions used by processing logic 220 may also, or alternatively, be stored in another type of computer-readable medium accessible by processing logic 220. A computer-readable medium may include one or more physical or logical memory devices.

Input device 340 may include one or more mechanisms that permit a user to input information to communication device 100, such as microphone 160, keypad 150, control buttons 140, a keyboard, a gesture-based device, an optical character recognition (OCR) based device, a joystick, a virtual keyboard, a speech-to-text engine, a mouse, a pen, voice recognition and/or biometric mechanisms, etc.

Output device 250 may include one or more mechanisms that output information to the user, including a display, such as display 130, a printer, one or more speakers, such as speakers 120 and/or 195, etc. Power supply 260 may include one or more batteries or another power source used to supply power to components of mobile communication device 100. Power supply 260 may also include control logic to control application of power from power supply 260 to one or more components of mobile communication device 100.

Communication interface 270 may include any transceiver-like mechanism that enables mobile communication device 100 to communicate with other devices and/or systems. For example, communication interface 270 may include a modem or an Ethernet interface to a LAN. Communication interface 270 may also include mechanisms for communicating via a network, such as a wireless network. For example, communication interface 270 may include one or more radio frequency (RF) transmitters, receivers and/or transceivers. Communication interface 270 may also include one or more antennas for transmitting and receiving RF data.

In the exemplary implementation of FIG. 2, location identification device 280 may include, for example, a built-in GPS receiver, a mobile phone locator application, a personal locator beacon, or other geo-spatial positioning application or component. The location identification device 280 may, in conjunction with the other components of mobile communication device 100, determine the current position of mobile communication device 100 by receiving, for example, signals from GPS satellites or other devices.

Mobile communication device 100 may provide a platform for a user to make and receive telephone calls, send and receive electronic mail, text messages, play various media, such as music files, video files, multi-media files, games, and execute various other applications. Mobile communication device 100 may also perform processing associated with switching or varying the reflectivity associated with components of rear display 170. Mobile communication device 100 may perform these operations in response to processing logic 220 executing sequences of instructions contained in a computer-readable medium, such as memory 230. Such instructions may be read into memory 230 from another computer-readable medium via, for example, communication interface 270 and/or location identification component 280. In alternative embodiments, hard-wired circuitry may be used in place of or in combination with software instructions to implement operations described herein. Thus, implementations described herein are not limited to any specific combination of hardware circuitry and software.

Figure 3:
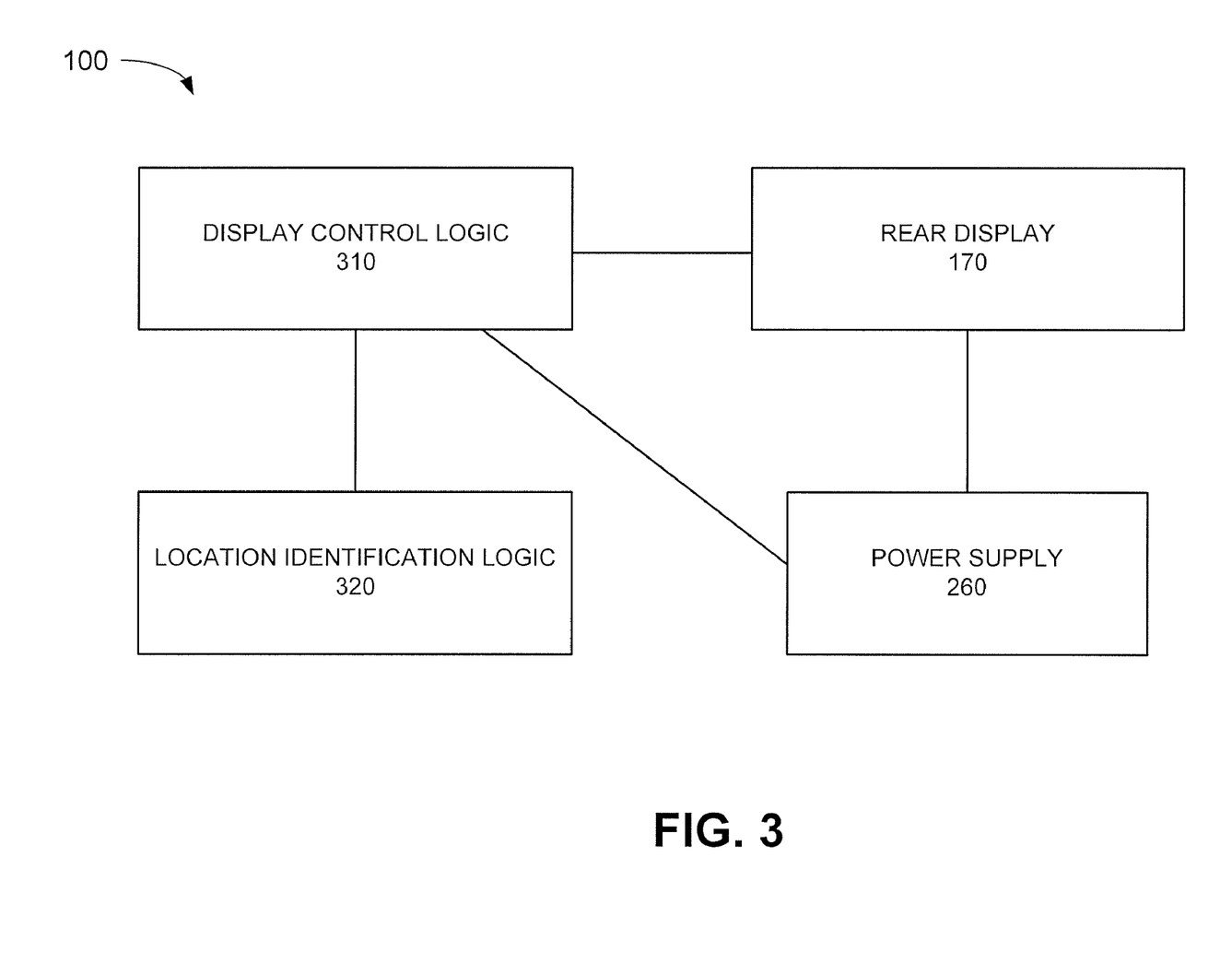
FIG. 3 illustrates a functional diagram of exemplary components in the mobile communication device of FIG. 2 according to an exemplary implementation.

FIG. 3 is a functional diagram of components implemented in mobile communication device 100. Referring to FIG. 3, mobile communication device 100 may include display control logic 310, communications interface 270, location identification component 280, rear display 170 and power supply 260. Display control logic 310 may be included in processing logic 220 and location identification logic 320 may be included in location identification device 280 and/or other devices communicating through communications interface 270.

Location identification logic 320 may identify the geographic location of mobile communication device 100, and thus, the geographic location of the user of mobile communication device 100. Location identification logic 320 may identify the geographic location of a "target" (e.g., a person or place of interest to the user), as indicated by the user through, for example, input device 240. A desired person of interest may be, for example, the location of another mobile communication device user. A desired place of interest may be, for example, a general direction (e.g., north), a particular street address, a landmark, or a city. Location identification logic 320 may use either internal processing or external information to identify a direction or sequence of directions to allow the user of mobile communication device 100 to travel from the user's present geographic location to the user's desired location (i.e., target).

Display control logic 310 may switch or change the reflective/transparent properties of one or more components of rear display 170 based on, for example, a desired direction indicated by Location identification logic 320. Upon an instruction from display control logic 310, power supply 260 may provide a short voltage "burst" to alter the reflective/transparent properties of at least a portion of rear display 170 so that a direction is indicated. As used herein, a burst may be the application of power for a discrete period of time sufficient to alter the properties of a changeable medium.

For example, in one implementation, display control logic 310 may receive an indication from location identification logic 320 that a requested place of interest is east of the present geographic location of mobile communication device 100. In response to this indication, display control logic 310 may automatically signal or instruct power supply 260 to provide power to rear display 170 to selectively display an indicator (e.g., indicator 180 of FIG. 1B) most closely indicating an eastward direction.

Because rear display 170 may include an electrochromic glass system, continuous power is not required to maintain the directional indication. The directional indication on rear display 170 may remain unchanged until a subsequent voltage burst is provided from power source 260. The use of discreet voltage bursts may have lower power consumption compared to a typical display, such as an LED or LCD display. Location identification logic 320 may continue to monitor (in, for example, real-time or at regular intervals) the orientation/location of mobile communication device 100 and the geographic location of the target. Location identification logic 320 may provide an indication to display control logic 310 to alter the appearance of rear display 170 as the orientation/locations change.

Figure 4:
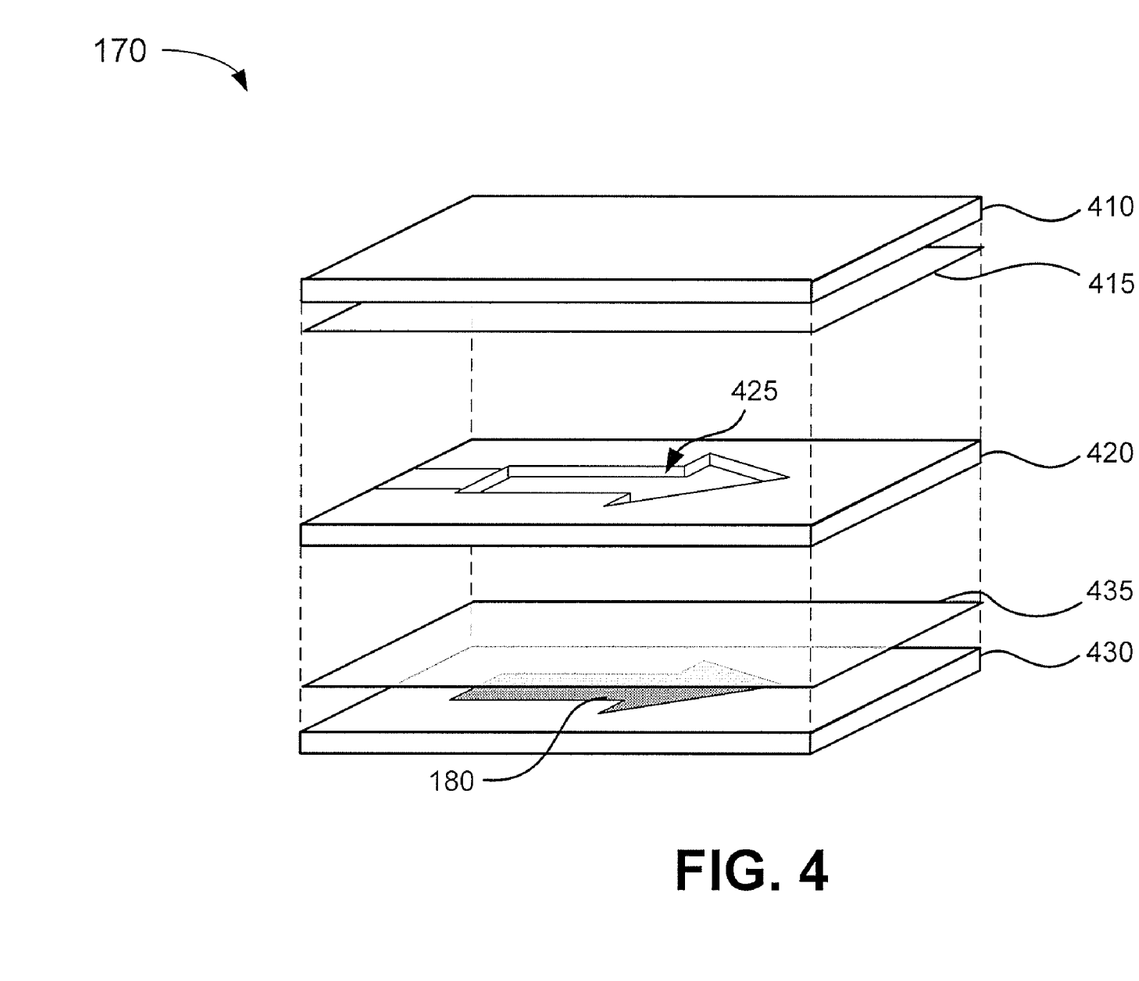
FIG. 4 is a diagram illustrating portions of an exemplary variable display of FIG. 1B according to an exemplary implementation.

FIG. 4 schematically illustrates portions of rear display 170 according to an exemplary implementation. While implementations shown herein relate to electrochromic technology, other switchable glass (e.g., "smart glass") or glazing technology may be used that changes and substantially maintains particular properties—such as light transmission, color, or another optical property—in response to bursts of applied power. In the exemplary implementation of FIG. 4, which is an exploded view of a portion of rear display 170, rear display 170 may be constructed generally of top layer 410 and bottom layer 430 with at least one sealing frame layer 420 located between them. Top layer 410 may be glass, plastic (e.g., polycarbonate) or another substantially transparent material. Bottom layer 430 may be of the same or different material as top layer 410. Each of top layer 410 and bottom layer 430 may include an electrically conductive layer 415 and 435 located on their respective inner surfaces so as to be adjacent sealing frame layer 420. Electrically conductive layers 415 and 435 may be light-transparent.

Top layer 410, electrically conductive layer 415, sealing frame layer 420, electrically conductive layer 435, and bottom layer 430 may be secured to form a flat chamber 425 which contains an electrochromic medium or another medium that changes its light transmission, color, and/or other optical property under the action of a voltage applied through the electrically conductive layers 415 and 435. In other implementations, indicator 180 or another image or text may be included in, on or under bottom layer 430. While the structure described in FIG. 4 illustrates one possible structural arrangement of an electrochromic structure in one implementation, other arrangements of layers, including the addition or elimination of layers may be used that allow encasement of a medium that can change properties and maintain changed properties in the absence of applied power.

Figure 5A:
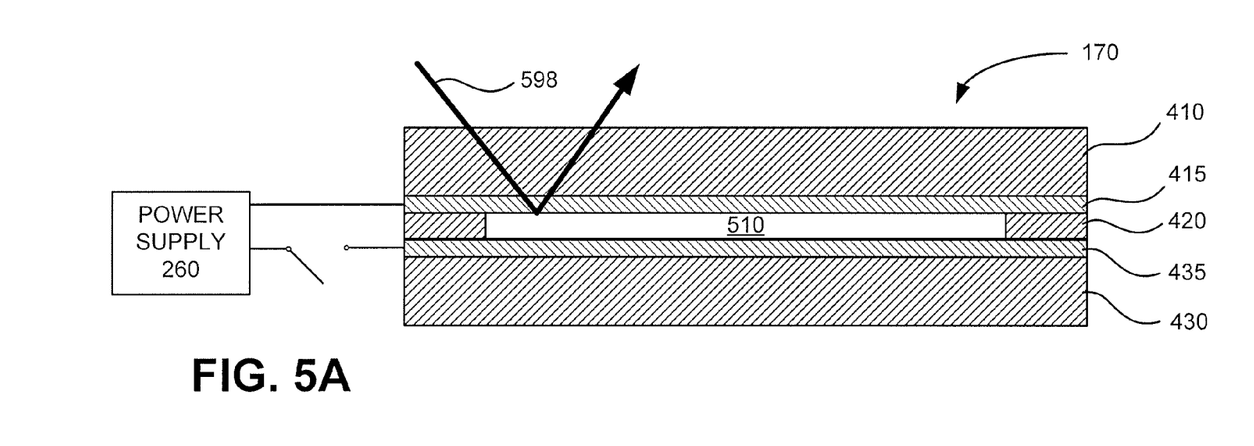
FIG. 5 is a diagram illustrating the function of the variable display of FIG. 4 according to an exemplary implementation.
Figure 5B:
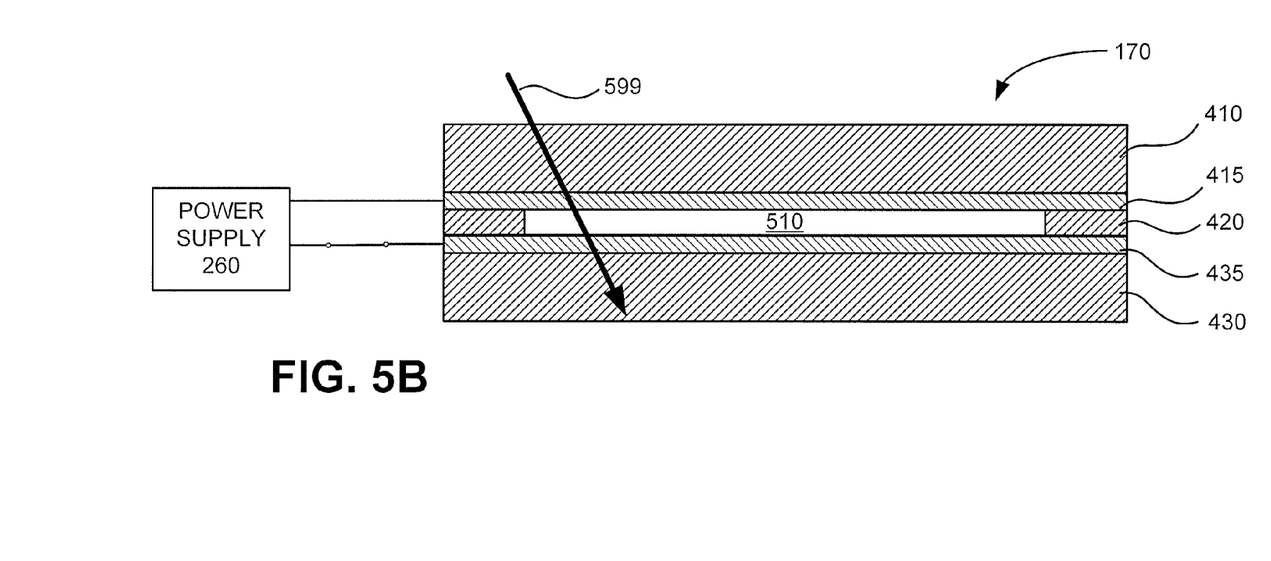

FIGS. 5A and 5B illustrate a portion of rear display 170 according to an exemplary implementation. In this implementation, a cross-section of a portion of rear display 170 is shown. Top layer 410, electrically-conductive layer 415, sealing frame layer 420, electrically conductive layer 435, and bottom layer 430 are shown secured together to enclose an electrochromic medium 510. The electrochromic medium 510 may be, for example, a liquid, a gel, or a solid. A small burst of voltage may change the color, reflectivity, and/or opacity of the electrochromic medium 510, and once the change is effectuated, little or no additional voltage is needed to maintain the achieved change.

In the exemplary implementation of FIGS. 5A and 5B, electrochromic medium 510 may change between transparent and mirror-like states in response to voltage from power source 260 so that the visible appearance of rear display 170 may change as electrochromic medium 510 changes its optical properties. In FIG. 5A, electrochromic medium 510 is shown in a reflective state. Ambient light incident on an exposed surface of rear display 170 may pass through top layer 410 and electrically-conductive layer 415, substantially reflect off electrochromic medium 510, and substantially transmit back through electrically-conductive layer 415 and top layer 410, as indicated by line 598 in FIG. 5A.

In FIG. 5B, a burst of voltage from power source 260 is applied to electrically-conductive layer 415 and 435, changing the optical properties of electrochromic medium 510 to a substantially transparent state. In FIG. 5B, ambient light incident on an exposed surface of rear display 170 may pass through top layer 410, electrically-conductive layer 415, electrochromic medium 510, electrically conductive layer 435, and (optionally) bottom layer 430, as indicated by line 599 in FIG. 5B.

In one exemplary implementation, direction indications may be made visible when the optical properties of electrochromic medium 510 are changed to a substantially reflective state in the shape of an indicator (see, e.g. chamber 425 of FIG. 4). In another exemplary implementation, indicators, such as indicator 180 on a portion of the surface of bottom layer 130 (FIG. 4), may be visible when the optical properties of electrochromic medium 510 are in a substantially transparent state.

Figure 6:
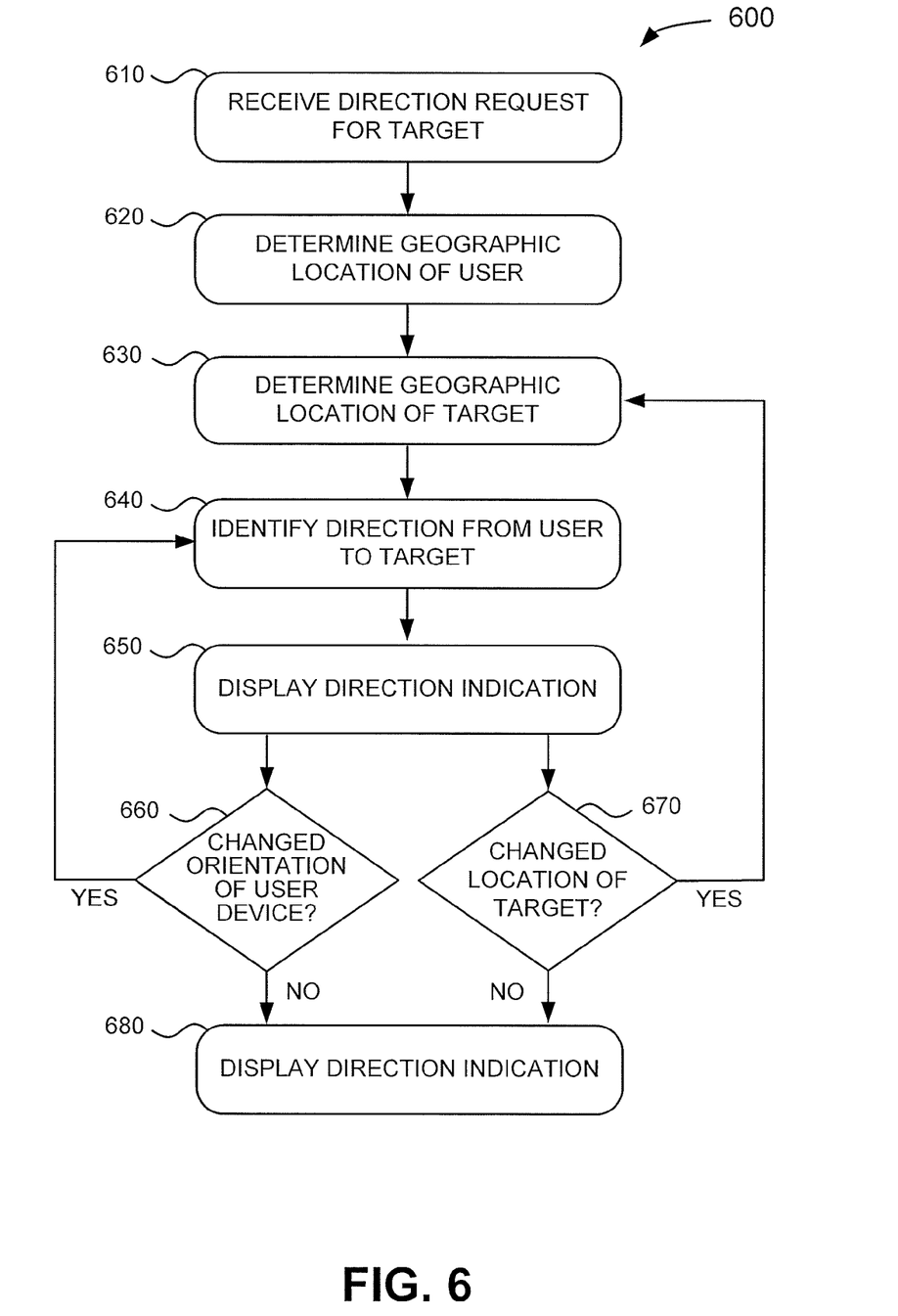
FIG. 6 is a flow diagram illustrating exemplary process performed by a mobile communication device.

FIG. 6 is a flow diagram 600 illustrating a process that may be performed by mobile communication device 100 in an exemplary implementation. Referring to block 610, processing may begin when a user provides input (through, for example, input device 240) requesting a direction indication to a target. The target may be, for example, a direction (e.g., southwest); a person of interest, such as another mobile communication device user; or a location. In one implementation, the target may be identified from a pre-programmed list, such as a "friends" list that may include information about the mobile communication devices of other people. In one implementation, a friend may grant permission have a navigation service provide the geo-position coordinates of their target mobile communication device in response to a request from mobile communication device 100. In other implementations, one or more mobile communication device 100 may include beacon signals that can be received by another mobile communication device 100.

Still referring to block 610, in another implementation, a fixed location target may be identified by using mapping, navigation or address searching applications. In still another implementation, the target may be identified by selecting from a list of pre-stored geo-positioning coordinates, such as coordinates of a particular location (e.g., "home") or landmark (e.g., the Louvre).

Referring to block 620, mobile communication device 100 can identify its own geographic location that corresponds to the geographic location of the user. The mobile communication device location may be identified using, for example, a built-in GPS receiver that receives signals from GPS satellites.

Referring to block 630, mobile communication device 100 may determine the geographic location of the target requested by the user. Identifying the location of the target may be done before, after or in parallel with identifying the location of the user. As noted previously, in some implementations the geographic location of the target may already be stored in, for example, a memory of mobile communication device 100. In other implementations, a target query may be posted to the Internet via for example, a General Packet Radio Service (GPRS) connection or other connection to a navigation service provider. The navigation service provider may respond with one or more search results, depending on the nature of the information requested.

Once the geographic location of the user and the geographic location of the target have been identified, the direction from the user to the target may be determined. Referring to block 640, the mobile communications device 100 may identify the direction from the user's location to the target's location. This determination may be accomplished using, for example, processing logic 220 of mobile communication device 100. In another implementation, the direction to the target may be identified using a query to a navigation service provider.

Referring to block 650, the direction from the user to the target may be indicated on a display, such as rear display 170, of mobile communication device 100 that can be maintained with little to no additional power consumption. As described above with respect to FIG. 1, the display may include an electrochromic glass system so that continuous power is not required to maintain the display of the directional indication.

A change in the location or orientation of mobile communication device 100 may require that the direction indication be changed on the rear display 170 of mobile communication device 100. Referring to block 660, mobile communication device 100 may continue to monitor (in, for example, real-time or at regular intervals) the orientation and geographic location of mobile communication device 100. Software in the mobile communication device may use the current position to determine the user's starting point when the user indicates the target, and then update continuously as the user moves towards the target. If mobile communication device 100 changes location or orientation to the extent that an update to the displayed direction indication is required, mobile communication device 100 may again calculate the direction from the user to the target, as described previously with respect to block 640. If the orientation of mobile communication device 100 is not changed, the most recent direction indication may remain displayed (block 650).

In parallel with monitoring the orientation/location of the mobile communication device, the location of the target may also be monitored. A change in the geographic location of the target also may require that the direction indication be changed on the display of mobile communication device 100. If the target is not a fixed location (e.g., the target is another mobile communication device), mobile communication device 100 may continue to display a direction to the geographic location of the target. If the target changes location that requires an update to the displayed direction indication on mobile communication device 100, mobile communication device 100 may again calculate the direction from mobile communication device 100 to the target, as described previously with respect to block 630. If the direction from mobile communication device 100 to the target does not change, the most recent direction indication may remain displayed (block 650).

Figure 7:
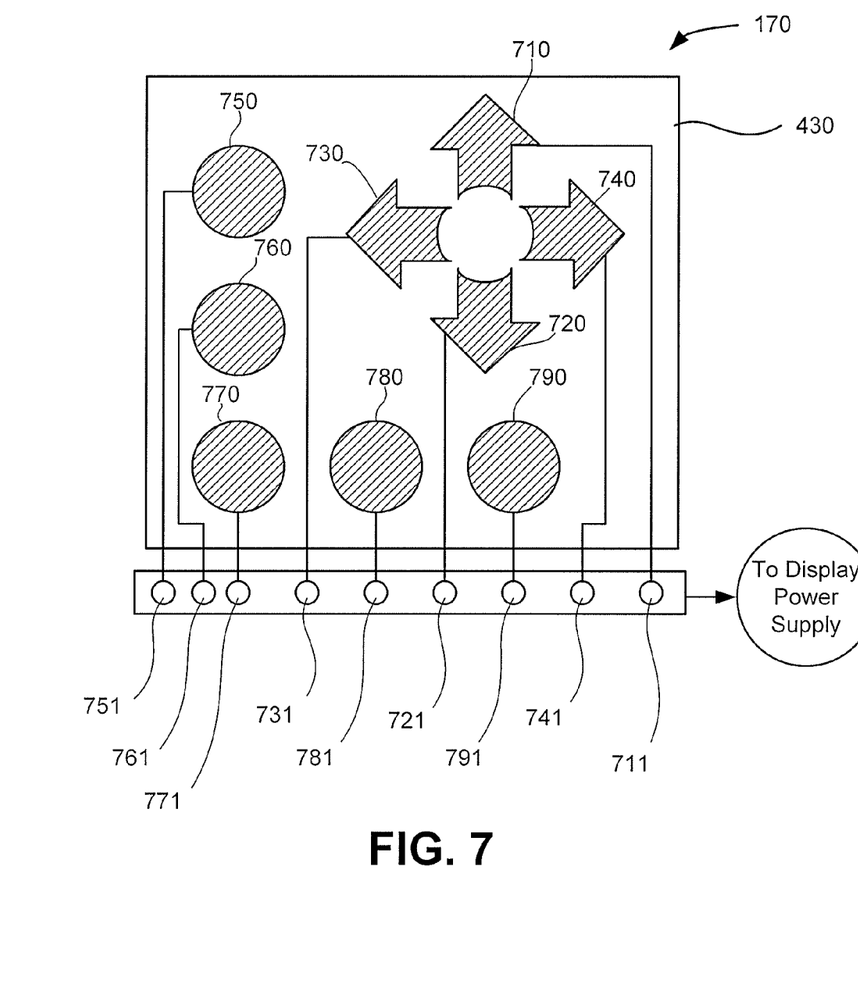
FIG. 7 is a diagram illustrating portions of the display of FIG. 1B according to another exemplary implementation.

FIG. 7 is a diagram illustrating portions of rear display 170 according to another exemplary implementation. FIG. 7 illustrates multiple electrically conductive layers, 710, 720, 730, 740, 750, 760, 770, 780 and 790 that may each correspond to a separate indicator for rear display 170. For illustrative purposes, the electrically conductive layers are shown as mounted on a bottom layer, such as bottom layer 430. Depending on the implementation of the electrochromic technology, each electrically conductive layer 710, 720, 730, 740, 750, 760, 770, 780 and 790 may have a corresponding sealing frame layer (such as sealing frame layer 420 of FIG. 4) and/or another electrically conductive layer (such as electrically conductive layer 415 of FIG. 4). The electrically conductive layers 710, 720, 730, 740, 750, 760, 770, 780 and 790 may each be controlled by a respective contact 711, 721, 731, 741, 751, 761, 771, 781 and 791. The display control logic may signal a power source, such as power source 260, to provide voltage bursts to one or more of contacts 711, 721, 731, 741, 751, 761, 771, 781 and 791 to enable or block visibility of a corresponding indicator.

Figure 8:
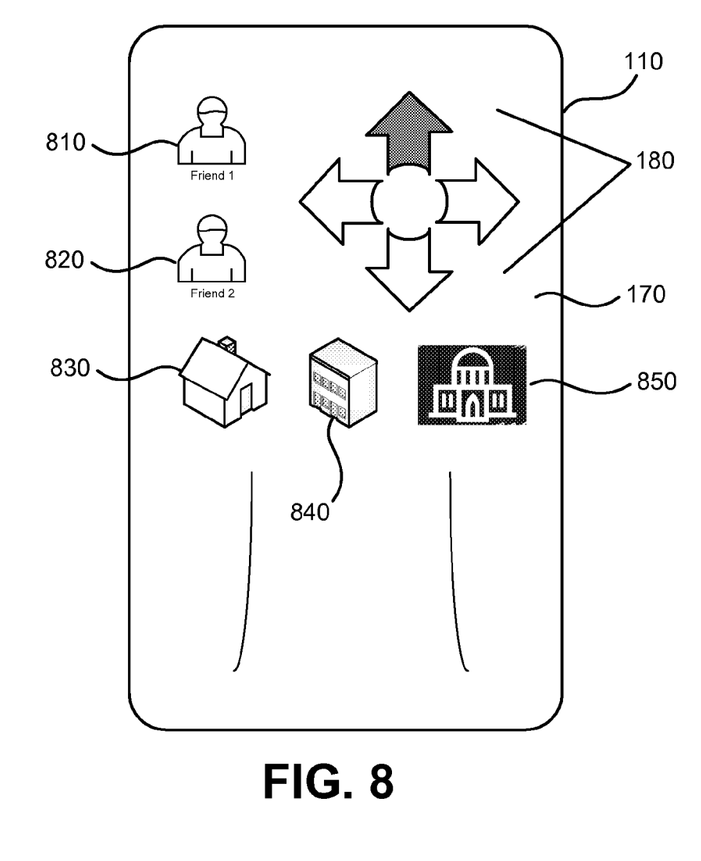
FIG. 8 is a diagram illustrating portions of a rear panel display of FIG. 1B according to an exemplary implementation.

FIG. 8 is a diagram illustrating portions of a rear panel display according to an exemplary implementation. Indicators 180 and identifiers 810, 820, 830, 840, and 850 may be affixed on a bottom layer 430 that will be installed beneath an electrochromic layer (not shown in FIG. 8) of rear display 170. Indicators 180 may be displayed selectively when display control logic directs the power supply to provide voltage bursts to selected indicators as described in more detail above. Similarly, indicators 180 may be associated with one or more identifiers 810, 820, 830, 840, and 850. For example, if a mobile communication device user has identified a particular person as a target, rear display 170 may be instructed to display the "Friend 1" identifier 810 along with indicator 180 to the mobile communication device associated with the targeted person. A target of second particular person may be identified as "Friend 2" using identifier 820. A target of a particular place of interest, such as a home or an office, may be indicated using home identifier 830 and office identifier 840, respectively. As another example, if a user wanted to identify the direction of Mecca, rear display 170 may be instructed to display identifier 850 that may be associated with that location, along with the appropriate indicator 180 pointing to the holy city in Saudi Arabia's Makkah Province.

Figure 9:
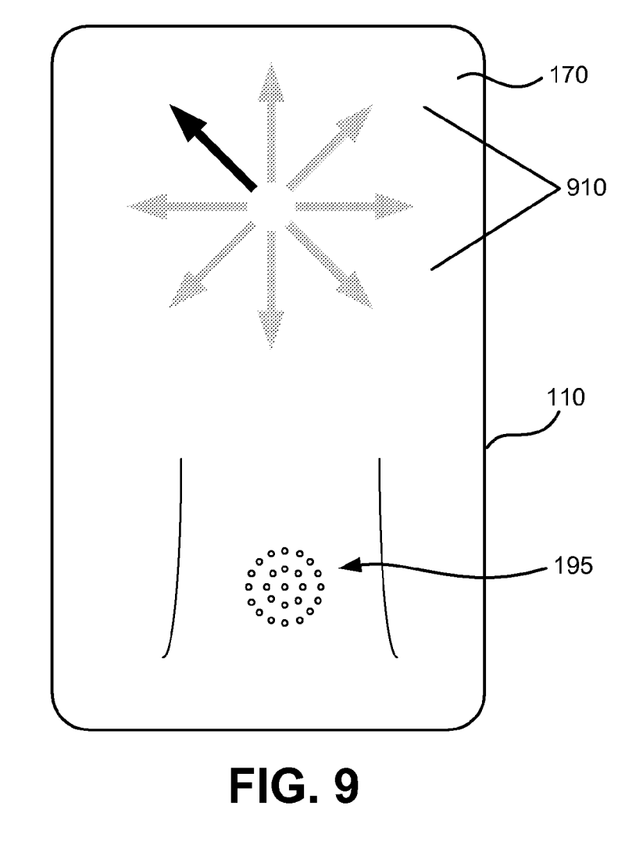
FIG. 9 is a diagram illustrating portions of a back panel display of FIG. 1B according to another exemplary implementation.

FIG. 9 is a diagram illustrating portions of a rear display according to another exemplary implementation. As shown in FIG. 9, rear display 170 may be integrated directly into the structure of the rear portion of housing 110. Indicators 910 may be affixed on a portion of rear display 170 that may include switchable glass or glazing technology that can change and substantially maintain particular properties-such as light transmission, color, or other optical properties-in response to bursts of applied power. Indicators 910 may be displayed selectively by display control logic as described in more detail above.

Figure 10:
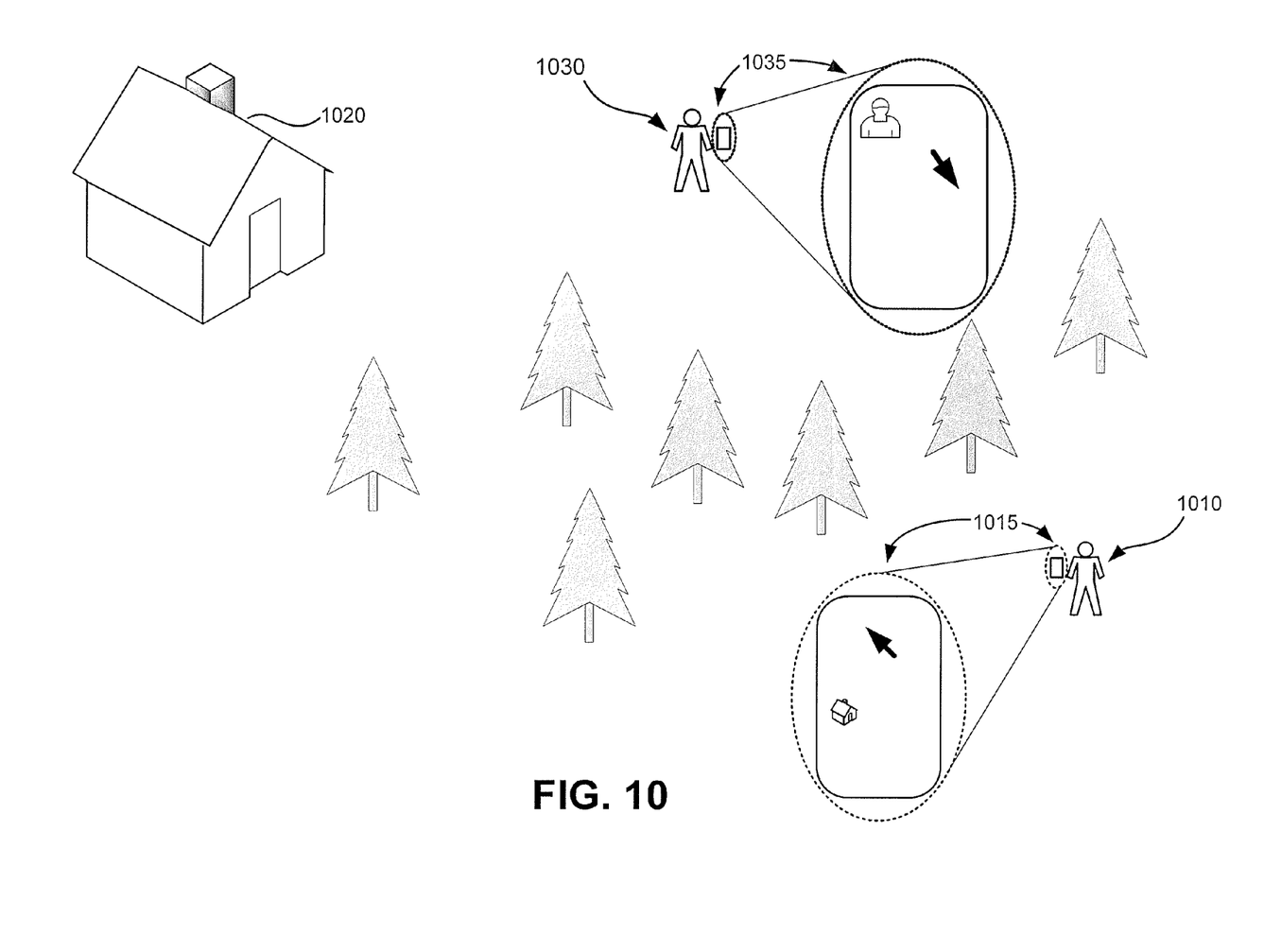
FIG. 10 is a diagram illustrating an exemplary use for the mobile communication device of FIGS. 1A and 1B according to an exemplary implementation.

FIG. 10 provides an example of a user using a mobile communication device in accordance with an implementation. Person 1010 may be walking, for example, in a forest and may become disoriented. Seeking the direction to his home 1020, person 1010 operating his mobile communication device 1015 inputs into the mobile communication device 1015 a request for the direction to "home." His mobile communication device 1015 determines the geo-spatial position of mobile communication device 1015 (and, consequently, the position of person 1010). The geo-spatial position of home 1020, in this example, has been previously stored in memory of mobile communication device 1015. Mobile communication device 1015 retrieves the location information of home 1020 from memory and identifies the direction from mobile communication device 1015 to home 1020. A directional arrow that points in the general direction of home 1020 is displayed on a portion of mobile communication device 1015 that has an electrochromic glass system that changes appearance when voltage is applied. A separate indication of what the directional arrow corresponds to (e.g., "home") may also be displayed on mobile communication device 1015. The directional arrow remains displayed on the mobile communication device without additional power to the display, unless a change in the arrow direction is needed, due to, for example, a change in the orientation of mobile communication device 1015.

Following the direction indicated by mobile communication device 1015, person 1010 begins walking toward home 1020. However, after several minutes of walking, person 1010 becomes disabled and is unable continue toward home 1020. Person 1010 requests assistance of another person 1030 by placing a call to her mobile communication device 1035. However, person 1010 is unable to verbally describe his location to person 1030. Seeking the direction to person 1010, person 1030, operating her mobile communication device 1035, inputs into mobile communication device 1035 a request for the direction to mobile communication device 1015 (and, consequently, the position of person 1010). Through a navigation service, the geo-spatial position of mobile communication device 1015 is provided to mobile communication device 1035. Also using a navigation service, mobile communication device 1035 then determines its own geo-spatial position. Mobile communication device 1035 identifies the direction from the mobile communication device 1035 to mobile communication device 1015. A directional arrow that points generally toward mobile communication device 1015 is displayed on a portion of mobile communication device 1035 that has an electrochromic glass system that changes appearance when voltage is applied. Person 1030 is able to follow the directional arrow on her mobile communication device 1035 toward person 1010 and assist him in returning home.

CONCLUSION

Implementations described herein may include a secondary display for a mobile communication device that may include an electrochromic glass system that changes appearance when voltage is applied. The secondary display may be adjusted to alter the optical properties of sections of the display between, for example, reflective and transparent. The sections of the display may be shaped as direction indicators and used in combination with GPS-enabled features of the mobile communication device to indicate directions to a user. The direction indications may be adjusted as the orientation of the mobile communication device is changed, but the secondary display only requires power when a change to the display occurs.

The foregoing description of the embodiments described herein provides illustration and description, but is not intended to be exhaustive or to limit the invention to the precise form disclosed. Modifications and variations are possible in light of the above teachings or may be acquired from practice of the invention.

For example, implementations have been mainly described in the context of a mobile communication device. These implementations, however, may be used with any type of mobile device that includes a display.

As another example, it should be noted that reference to a GPS-enabled device is not limited to GPS systems only, and that any global navigation satellite system or other system that provides geo-spatial positioning may be used in implementations described herein.

As yet another example, implementations have been described with respect to certain electrochromic technology. Other technology may be used to accomplish certain implementations, such as different types of glazing or thin films that change their light transmission properties in response to an environmental signal such as light, temperature, or voltage.

Further, while a series of blocks has been described with respect to FIG. 6, the order of the blocks may be varied in other implementations. Moreover, non-dependent blocks may be performed in parallel.

Aspects described herein may be implemented in methods and/or computer program products. Accordingly, aspects may be embodied in hardware and/or in software (including firmware, resident software, micro-code, etc.). Furthermore, aspects described herein may take the form of a computer program product on a computer-usable or computer-readable storage medium having computer-usable or computer-readable program code embodied in the medium for use by or in connection with an instruction execution system. The actual software code or specialized control hardware used to implement these aspects is not limiting. Thus, the operation and behavior of the aspects were described without reference to the specific software code-it being understood that software and control hardware could be designed to implement the aspects based on the description herein.

Further, certain aspects described herein may be implemented as "logic" that performs one or more functions. This logic may include hardware, such as a processor, microprocessor, an application specific integrated circuit or a field programmable gate array, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A mobile communication device, comprising:
   a receiver to receive geo-positioning signals for the mobile communication device and for a selected target;
   a display including a plurality of pre-defined shapes to indicate a direction related to the geo-positioning signals;
   a power source to selectively supply voltage to one or more of the plurality of pre-defined shapes to alter an optical property of the one or more of the plurality of pre-defined shapes to indicate a direction; and
   a processor to:
      identify a direction related to the geo-positioning signals, where the direction related to the geo-positioning signals is a direction from the mobile communication device to the selected target,
      cause the power source to supply a burst of voltage to alter the state of one of the plurality of indicators to visibly indicate an approximate direction to the selected target,
      cause the power source to remove the supplied burst of voltage, where the visible indication of the direction to the target remains visible after the supplied burst of voltage is removed,
      monitor the geo-spatial position of the target to detect movement of the target, and
      cause, based on detecting movement of the target, the power source to supply another burst of voltage to alter the state of another one of the plurality of indicators to visibly indicate an updated approximate direction to the selected target, where the visible indication of the updated direction to the target remains visible after the supplied other burst of voltage is removed.

2. The mobile communication device of claim 1, where the optical property of the one or more of the plurality of pre-defined shapes remains substantially stable after the supplied voltage is removed.

3. The mobile communication device of claim 2, where the display is an electrochromic display.

4. The mobile communication device of claim 2, where the mobile communication device comprises a cellular radio telephone and where the optical property of the one or more of the plurality of pre-defined shapes remains substantially stable when the cellular radio telephone is in operation.

5. The mobile communication device of claim 1, where each of the plurality of pre-defined shapes indicates a unique direction and where voltage is supplied to one of the plurality of pre-defined shapes based on the direction to the target.

6. The mobile communication device of claim 1, further comprising a backside cover, where the display is formed on the backside cover.

7. The mobile communication device of claim 6, where the backside cover comprises electrochromic glass.

8. The mobile communication device of claim 1, further comprising:
   a processor to automatically switch from displaying the one or more of the plurality of pre-defined shapes to displaying another of the one or more of the plurality of pre-defined shapes based on a change in the orientation of the mobile communication device.

9. The mobile communication device of claim 1, where the display further comprises at least one identifier for the target that is configured to remain exhibited after supplied power is removed from the display.

10. The mobile communication device of claim 1, where the target is another mobile communication device.

11. The mobile communication device of claim 1, where the geo-positioning signals are Global Positioning System (GPS) signals.

12. The mobile communication device of claim 1, where the optical property is altered from a transparent state to a reflective state.

13. A method performed by a mobile device, the method comprising:
   receiving a request for a direction to a target;
   determining a geo-spatial position of the mobile device;
   determining a geo-spatial position of the target;
   indicating on the mobile device an approximate direction from the mobile device to the target, where the indicating comprises supplying power to display a direction indicator to the target on a surface of the mobile device;
   removing the supplied power to the display, where the direction indicator remains exhibited when the power is removed;
   detecting, after the removing the supplied power, a change to the geo-spatial position of the target; and
   supplying, based on detecting the change, additional power to remove the display of the direction indicator to the target and to display a different direction indicator to the target that remains exhibited when the power is removed.

14. The method of claim 13, further comprising:
   monitoring one or more of an orientation or the geo-spatial position of the mobile device; and
   updating the display of the different direction indicator when the orientation or the geo-spatial position of the mobile device changes to an extent that the different direction indicator no longer indicates the approximate direction to the target.

15. The method of claim 13, further comprising:
   indicating on the surface of the mobile device an identifier for the target, where the identifier remains exhibited when no power is supplied.

16. The method of claim 13, where indicating on the mobile device an approximate direction further comprises:
   supplying a voltage burst to at least a portion of an electrochromic display.

17. A mobile device, comprising:
   means for receiving a request for direction to a target;
   means for determining a geo-spatial position of the mobile device;
   means for determining a geo-spatial position of the target;
   means for supplying power to display an indicator on the mobile device, where the indicator provides an approximate direction from the mobile device to the target;
   means for removing the power to the display, where the indicator remains displayed after the power is no longer provided;
   means for detecting a change in the geo-spatial position of the target;
   means for providing additional power to alter, based on input from the means for detecting the change, the display of the indicator on the mobile device, where the indicator remains altered after the additional power is no longer provided; and means for displaying at least one identifier for the target that is configured to remain exhibited after the power and the additional power are no longer provided.

18. The device of claim 17, further comprising:

means for monitoring an orientation of the mobile device, where the display of the indicator is altered based on a change to the orientation of the mobile device and/or a change to the geo-spatial position of the mobile device.

19. A mobile communication device, comprising:

a housing;

a power supply contained within the housing;

a location identification device to transmit and receive geo-spatial position information;

a rear cover secured to the housing and operatively connected to the power supply, the rear cover comprising a display including a plurality of indicators that toggle between a substantially transparent state and a substantially reflective state, where the display consumes power only when the state of one of the plurality of indicators is changed; and a processor to:
  receive a request for a direction to a target,
  apply power to alter the state of one of the plurality of indicators to indicate an approximate direction to the target based on the location of the target and the geo-spatial position information,
  remove power after altering the state of the one of the plurality of indicators, where the one of the plurality of indicators continue to indicate an approximate direction to the target after the power is removed,
  monitor a geo-spatial position of the target, and
  apply power to change the state of the one of the plurality of indicators when the geo-spatial position of the target changes with respect to the mobile communication device to an extent that the one of the plurality of indicators no longer indicates the approximate direction to the target.

* * * * *